(12) United States Patent
Luke

(10) Patent No.: US 6,580,037 B1
(45) Date of Patent: Jun. 17, 2003

(54) METHOD AND SYSTEM FOR REMOTE ERROR REPORTING ON WEIGHING EQUIPMENT

(76) Inventor: Tom Luke, 10708 N. Campbell, Kansas City, MO (US) 64155

( * ) Notice: Subject to any disclaimer, the term of this patent is extended or adjusted under 35 U.S.C. 154(b) by 85 days.

(21) Appl. No.: 09/734,109

(22) Filed: Dec. 11, 2000

Related U.S. Application Data

(60) Provisional application No. 60/227,340, filed on Aug. 23, 2000.

(51) Int. Cl.[7] .............................................. G01G 19/34
(52) U.S. Cl. .................... 177/25.13; 702/173; 705/414; 705/416
(58) Field of Search ........................... 177/25.11, 25.12, 177/25.13, 25.14, 25.15, 25.16, 25.17, 25.18; 702/173; 705/407, 414, 415, 416

(56) References Cited

U.S. PATENT DOCUMENTS 4,122,532 A  * 10/1978  Dlugos et al. ........... 177/25.15
4,868,757 A  * 9/1989   Gil ........................... 177/25.15
5,319,562 A  * 6/1994   Whitehouse ................ 705/408
5,606,507 A  * 2/1997   Kara ......................... 705/408
5,638,442 A  * 6/1997   Gargiulo et al. ............ 705/403
5,650,930 A  * 7/1997   Hagenbuch ................. 702/173
5,656,799 A  * 8/1997   Ramsden et al. ......... 177/25.14
5,745,887 A  * 4/1998   Gargiulo et al. ............ 705/410
5,764,522 A  * 6/1998   Shalev ....................... 702/173
5,878,376 A  * 3/1999   Schurr ..................... 177/25.13
6,035,291 A  * 3/2000   Thiel ......................... 705/408
6,356,882 B1 * 3/2002   Carroll et al. .............. 705/410
6,426,471 B1 * 7/2002   Gubitose ................. 177/25.15

* cited by examiner

Primary Examiner—Randy Gibson

(57) ABSTRACT

A method and system are provided for remotely reporting errors on weighing equipment. The reporting system provides error and diagnostic information for one or more scales to a central service center. The system includes a scale instrument in communication with a service center. Upon receiving load sensing information from the scale, the scale instrument reports the information to the service center. This information may include weight readings, error messages and diagnostic messages.

22 Claims, 3 Drawing Sheets

METHOD AND SYSTEM FOR REMOTE ERROR REPORTING ON WEIGHING EQUIPMENT

CROSS-REFERENCE TO RELATED APPLICATIONS

This application claims the benefit of U.S. provisional application Serial No. 60/227,340 filed Aug. 23, 2000.

STATEMENT REGARDING FEDERALLY SPONSORED RESEARCH OR DEVELOPMENT

Not Applicable.

FIELD OF THE INVENTION

The present invention relates to weighing equipment and, more particularly, to a method and system for receiving error messages at a location remote from the weighing equipment sending the error message.

BACKGROUND OF THE INVENTION

Weighing equipment is typically used to weigh semi-trailer trucks and railroad cars and engines at various points on a highway or railroad not limited to this specific application. It can also be used in all industrial applications commonly found in the process control industry. At these weighing stations various systems are utilized to weigh the equipment and then to process that information and report the information to the scale operator. Some of these weighing systems may include load cells and sectional controllers that electronically receive weight information and transfer the weight information on to an instrument control system that reports the information to the user at the scale site. Information such as diagnostic information and error information is also reported to the operator at the scale site. This information ensures that the scale is operational and running at its peak level of performance.

These electronic scales typically have the capability to show some types of error messages to the scale user at the site. This, while useful information, has the disadvantage in that it is displayed only to the operator at the scale. Thus, if the operator is not at the scale when the error is displayed or is reported, the error may go unnoticed.

Additionally, error messages and diagnostic messages from the scale system may be reported at odd working hours when the operator is not present to view or receive the message. This may cause the operator to miss an urgent message that may require servicing of the scale at that immediate moment and, if it is not done, the scale may fail to operate properly.

Accordingly, there exists a need for a method and system that reports diagnostic and error information to a central location that is remote to the scale site. Moreover, there is a need for such a method system that is more efficient and reliable and provides scale operators an early warning system to reduce scale downtime and/or eliminate erroneous scale readings.

SUMMARY OF THE INVENTION

Generally described, a remote error reporting system on weighing equipment is provided. The system includes a load sensing apparatus, a scale instrument operably coupled with the load sensing apparatus to receive weight load data and a service center device in communication with the scale instrument to receive the weight load data.

In another aspect of the invention, a method in a computer system for reporting weighing equipment performance data from one or more scales is provided. In accordance with the method, load sensing data is obtained from each of the one or more scales and is transmitted to a service center. The transmitted load sensing data is then processed at the service center. Finally, response data is sent by the service center and received at each of the one or more scales.

By providing a method and system for remotely reporting errors on weighing equipment, numerous advantages are realized. For example, the reporting system of the present invention provides error and diagnostic information for one or more scales to a central service center allowing scale operators to efficiently respond to scale operation problems. As such, the present system significantly reduces erroneous error readings and scale downtime.

BRIEF DESCRIPTION OF THE SEVERAL VIEWS OF THE DRAWING

The objectives and advantages of the present invention will become readily apparent to those skilled in the art from the following detailed description of the drawings, in which.

DETAILED DESCRIPTION OF THE INVENTION

Figure 1:
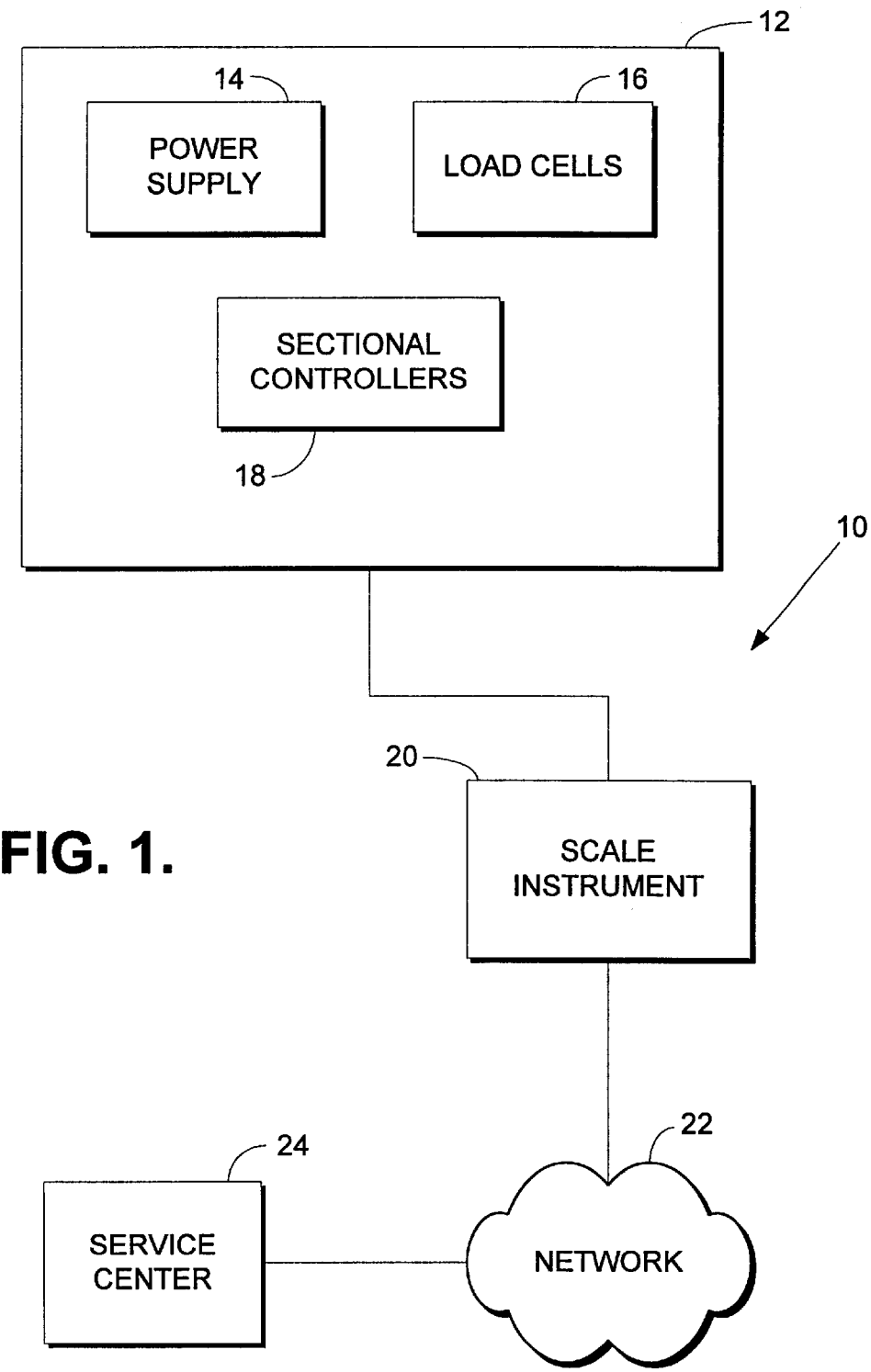
FIG. 1 is a schematic diagram of a preferred remote error reporting system of the present invention.

Turning now to the drawings in greater detail, and initially to FIG. 1, the system for remotely reporting weighing equipment errors of the present invention is designated generally by the reference number 10. The remote error reporting system 10 includes a load sensing apparatus 12 that includes a power supply 14, load cells 16 and sectional controllers 18. The load sensing apparatus and its associated components measure weight loads and other diagnostic information in the form of load sensing data. The load sensing apparatus 12 is coupled with a scale instrument 20 and receives the load sensing data obtained by the load sensing apparatus 12. The scale instrument 20 is then connected with network 22 that establishes a connection between the scale instrument 20 and a service center 24. It would be understood that multiple scale instruments, coupled with their associated load sensing apparatuses, could be connected to a single service center via the network and would receive the load sensing data obtained at each scale.

Figure 2:
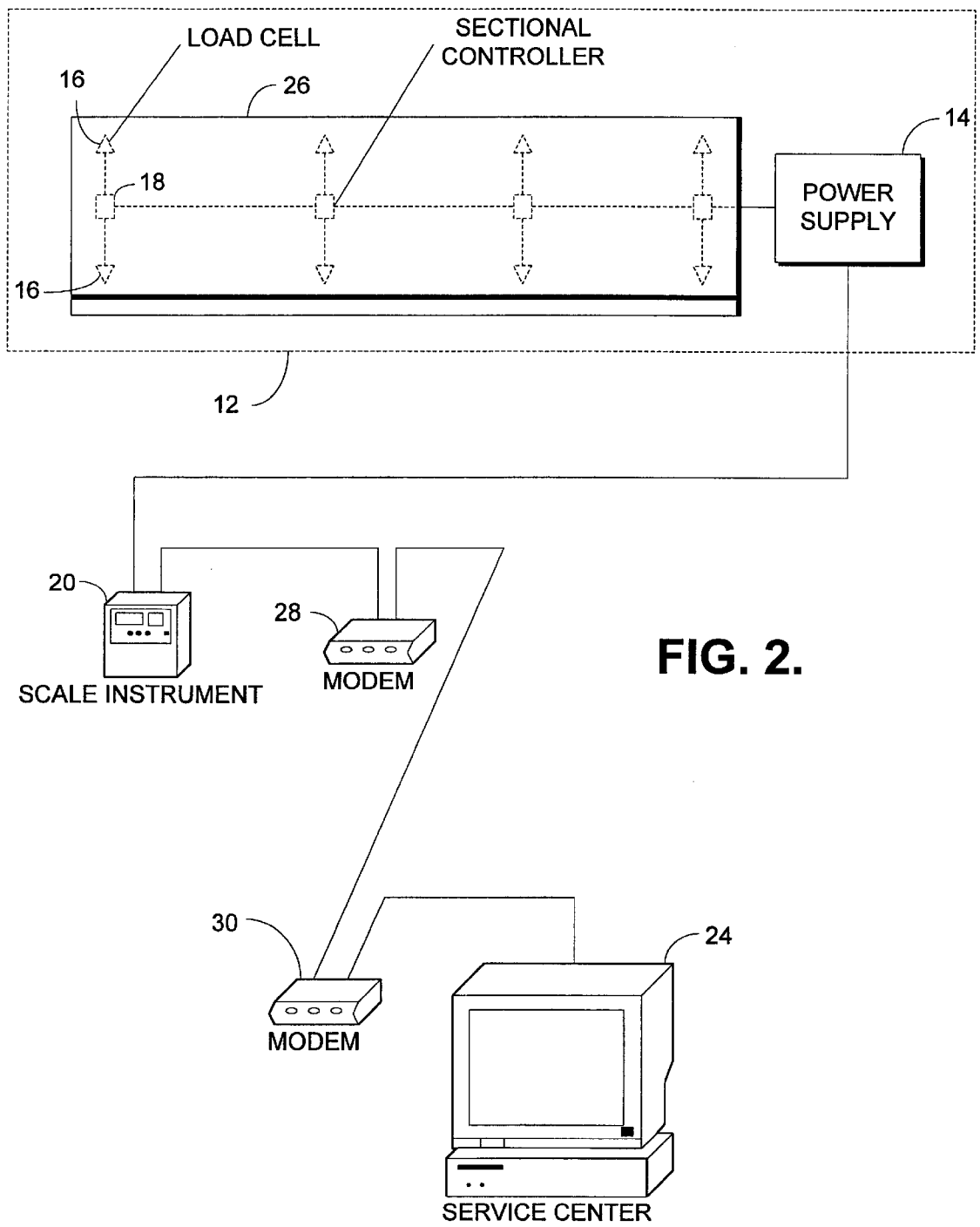
FIG. 2. is a schematic diagram of the preferred remote error reporting system of FIG. 1.

FIG. 2 further illustrates the preferred system for remotely reporting errors in the scale generally described in FIG. 1. The load sensing apparatus 12 includes a scale platform 26 that has multiple load cells 16 placed along the perimeter of the underside of the scale platform. Each pair of load cells is connected to a sectional controller 18 that receives analog signals from the load cells as weight is applied to the scale platform 26. The sectional controllers 18 convert the analog sensing data to digital data and the digital data is then communicated to the scale instrument 20 to be read by the scale operator.

Each sectional controller 18 is a device that accepts a pair of analog inputs from the load cells 16. Sectional controllers typically accept inputs from two load cells in a section of a scale, but may be configured to receive more than two. The two inputs are assigned identification numbers in the sectional controller. As mentioned above, these input channels receive analog input from the load cells and through these channels, the analog signals are sent to a single analog to digital converter within the sectional controller. The analog to digital converter multiplexes each load cell input and then converts the analog signal from each independent load cell to a digital signal as well as assigning a specific identification number to the load cell. This information is then sent to the scale instrument for further processing. The power supply 14 powers the sectional controllers and provides power surge suppression for the system. As would be understood, other devices that would receive load sensing data and then transmit the data to a scale instrument would be taught by this invention.

The scale instrument receives the load sensing data and passes this information onto the service center 24 via a communications network 22 (FIG. 1). The network 22 preferably includes a pair of modems 28, 30 that provide a direct connection between the scale instrument 20 and the service center 24. The first modem 28 is connected to the scale instrument and receives the processed load sensing data information from the scale instrument as well as other criteria from the instrument 20 and transmits that information to a second modem 30 that is coupled with the service center computer 24. As would be understood, the network may also include other direct and indirect methods of transmitting data from the scale instrument to the service center including local area networks and wide area networks. If using a local area network, the system would communicate via a network interface adaptor. If using a wide area network the system would typically use a modem or other means for establishing communications over the wide area network such as the Internet. Additionally, as would understood, the modems 28 and 30 could be internal or external to the computer.

The load sensing data received at the scale instrument and further processed and transmitted to the service center may include weight readings, error messages and diagnostic messages. Error messages and diagnostic messages may include, but are not limited to, the time, date, location of the scale, and mode of failure. Failure modes typically include load cell failures, sectional controller failures, over capacity warnings, memory failures, low internal battery voltage warnings, internal change in calibration parameters and programmable service dates to insure timely service of the scale.

Figure 3:
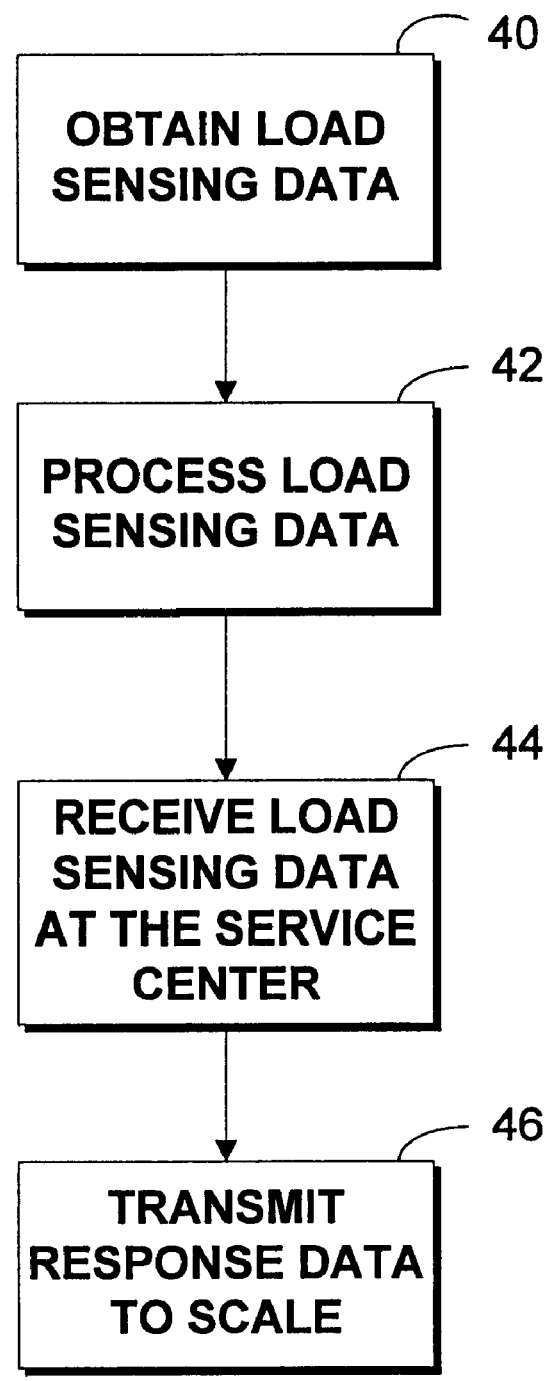
FIG. 3 is a flow diagram illustrating a preferred method for remotely reporting weighing equipment messages of the present invention.

In operation, the method for remotely reporting weighing equipment errors is illustrated in FIG. 3. At step 40, the load sensing apparatus obtains the load sensing data. This data is then received at the scale instrument and processed by the scale instrument at step 42. The processed load sensing data includes, but is not limited to, detected errors and diagnostic messages reported by the load sensing apparatus. The processed load sensing data is then transmitted on to the service center at step 44. When the error message or diagnostic message is received at the service center, a message is posted at the center and logged to a database or a technician can be called or paged.

As messages are received at the service center, personnel may review the messages as they are received or may review them after they have been logged into the database. If personnel at the service center require further information about a certain message, they may query the scale reporting the message at step 46 by transmitting a request for further information via the network back to the reporting scale instrument.

Constructed and operated as previously described, the remote error reporting system allows operators to efficiently operate multiple scales that results in a significant reduction in erroneous error readings and scale downtime. The ability to receive error and diagnostic information at a central location also allows scale operators to optimize service personnel over a large number of scales. Additionally, service personnel may be dispatched in a timely manner once errors are received at the service center location.

From the foregoing, it will be seen that this invention is one well adapted to attain all the ends and objects herein above set forth, together with other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matters herein set forth or shown in the accompanying drawings is to be interpreted as illustrative and not in a limiting sense.

What is claimed is:

1. A remote error reporting system on weighing equipment, the system comprising:

a load sensing apparatus;

a scale instrument operably coupled with the load sensing apparatus to receive weight load data and process the weight load data; and a service center device in communication with the scale instrument to receive the weight load data and transmit response data to the scale instrument.

2. The device in claim 1, wherein the load sensing apparatus includes a plurality of load cells.

3. The device in claim 2, wherein the load sensing apparatus includes a plurality of sectional controllers associated with the plurality of load cells.

4. The device in claim 1, wherein the scale instrument includes a display.

5. The device in claim 1, wherein the weight load data includes data indicative of weight of the scale load.

6. The device in claim 1, wherein the weight load data includes data indicative of scale diagnostic information.

7. The device in claim 1, wherein the weight load data includes data indicative of scale error information.

8. The device in claim 1, wherein the service center device is in communication with the scale instrument utilizing a modem.

9. A method in a computer system for reporting weighing equipment performance data from one or more scales, the method comprising:

obtaining load sensing data from a scale;

transmitting the load sensing data to a service center;

processing the processed load sensing data at the service center from each of the one or more scales; and receiving response data at each of the one or more scales.

10. The method as recited in claim 9, wherein the load sensing data includes data indicative of diagnostic information.

11. The method as recited in claim 10, wherein the diagnostic information data includes an error message, scale location and failure mode.

12. The method as recited in claim 9, wherein the processing of the load sensing data includes collecting the load sensing data into a database.

13. The method as recited in claim 12, wherein the storing of load sensing data occurs at the service center.

14. The method as recited in claim 9, wherein the processing of the load sensing data includes creating response data.

15. The method as recited in claim 9, wherein the response data is data indicative of a request from the service center seeking further load sensing data.

16. A method in a computer system for collecting weighing equipment performance data from one or more scales, the method comprising:

obtaining load sensing data from a scale;

receiving the load sensing data at a service center from each of the one or more scales;

processing the load sensing data; and transmitting response data to each of the one or more scales.

17. The method as recited in claim 16, wherein the load sensing data includes data indicative of diagnostic information.

18. The method as recited in claim 17, wherein the diagnostic information data includes an error message, scale location and failure mode.

19. The method as recited in claim 16, wherein the processing of the load sensing data includes storing the load sensing data into a database.

20. The method as recited in claim 19, wherein the storing of load sensing data occurs at the service center.

21. The method as recited in claim 16, wherein the processing of the load sensing data includes creating response data.

22. The method as recited in claim 16, wherein the response data is data indicative of a request from the service center seeking further load sensing data.

* * * * *

UNITED STATES PATENT AND TRADEMARK OFFICE
CERTIFICATE OF CORRECTION

PATENT NO. : 6,580,037 B1  Page 1 of 1
DATED : June 17, 2003
INVENTOR(S) : Tom Luke It is certified that error appears in the above-identified patent and that said Letters Patent is hereby corrected as shown below:

Column 1,
Line 55, after the word "method", please insert the word -- and --.

Column 3,
Line 35, after the word "would", please insert the word -- be --.

Column 4,
Line 22, please cancel "is" and replace with -- are --.

Signed and Sealed this

Twenty-eighth Day of October, 2003

JAMES E. ROGAN
*Director of the United States Patent and Trademark Office*